United States Patent [19]  [11] 3,943,443
Kimura et al.  [45] Mar. 9, 1976

[54] SPEED DETECTORS
[75] Inventors: Koya Kimura; Kunitaka Maeda, both of Numazu, Japan
[73] Assignee: Toshiba Kikai Kabushiki Kaisha, Tokyo, Japan
[22] Filed: Apr. 22, 1974
[21] Appl. No.: 463,179

[30] Foreign Application Priority Data
Apr. 26, 1973  Japan.............. 48-47751

[52] U.S. Cl. .................... 324/163; 310/15
[51] Int. Cl.² ............... G01P 3/46; H02K 35/00
[58] Field of Search ....... 324/163, 165, 164; 310/15

[56] References Cited
UNITED STATES PATENTS

| | | | |
|---|---|---|---|
| 2,409,857 | 10/1946 | Hines et al. | 310/15 |
| 2,479,699 | 8/1949 | Powell | 310/15 |
| 2,754,434 | 7/1956 | Frank | 310/15 |
| 3,711,724 | 1/1973 | Uemura | 324/165 |

FOREIGN PATENTS OR APPLICATIONS

| | | | |
|---|---|---|---|
| 185,675 | 10/1905 | Germany | 324/163 |
| 257,168 | 11/1969 | U.S.S.R. | 324/163 |

Primary Examiner—Alfred E. Smith
Assistant Examiner—Rolf Hille
Attorney, Agent, or Firm—Wenderoth, Lind & Ponack

[57] ABSTRACT

A speed detector for detecting the speed of a moving body is of the type including a magnetic core, a detection coil wound about the core, a magnet with one pole thereof faced toward the periphery of the detection coil with a definite air gap therebetween, and means for relatively moving the magnet with respect to the core and the coil in accordance with the movement of the moving body. the magnet is arranged such that the magnetic flux produced thereby crosses the detection coil two times, thereby inducing a direct current voltage in the detection coil having a magnitude proportional to the speed of movement of the moving body and a polarity depending upon the direction of movement thereof.

7 Claims, 10 Drawing Figures

SPEED DETECTORS

BACKGROUND OF THE INVENTION

This invention relates to a speed detector capable of detecting the speed of a linearly moving body without contacting the same, and more particularly to a speed detector constructed such that there is no limit of the range of movement of the body to be measured.

It has been almost impossible to directly detect the linear speed of a member actuated by an oil pressure driving device without contacting the member over a long stroke of several hundred milimeters. One example of a conventional contactless speed detector is illustrated in FIG. 1 of the accompanying drawing. The detector shown therein comprises a hollow cylindrical protective cover 1 of pure iron containing a detection coil 2 wound on a hollow bobbin, not shown, and held in a predetermined position with respect to the protective cover 1, and a rod shaped permanent magnet 3 having N and S poles and supported by a rod 3a at its one end. The magnetic flux produced by the magnet flows through the protected cover as shown by dotted lines 4.

As the magnet 3 is reciprocated by a moving body in the axial direction of the protective cover 1 into and out of the detection coil 2 a direct current voltage $e$ will be induced across the terminals $C_1$ and $C_2$ of the detection coil having a magnitude proportional to the relative speed between the magnet and the detection coil and a polarity depending upon the direction of movement of the magnet. The voltage $e$ is expressed by the following equation $$e = - \frac{d\Phi}{dt} = \oint_c (UBdL) - \iint_s \frac{\delta B_n}{\delta t} dS \qquad (1)$$

where
L: the length of the protective cover 1
Lc: the length of the detection coil 2
$\Phi$: the magnetic flux linking the detection coil
U: the speed vector of a conductor (in this case the conductor of the coil 2) with respect to a fixed coordinate axes
B: the density of the magnetic flux vector
dL: the segment vector of the conductor along a path C UBdL = U(BdL) = (U × B) .dL $B_n$: A component of vector B in a direction perpendicular to any closed curved surface S including the path C in the outer periphery thereof.

In the conventional speed detector shown in FIG. 1, as the magnet is supported in a cantilever fashion, the magnet tends to vibrate while it is reciprocated, thus causing the induced voltage $e$ to fluctuate. Moreover as it is necessary to increase its effective stroke Lc (the length of the detection coil) it is necessary to make the length of the protective cover to be more than two times that of the effective stroke.

SUMMARY OF THE INVENTION

It is an object of this invention to provide a new and improved speed detector capable of eliminating various defects of the prior art speed detector.

Another object of this invention is to provide an improved speed detector capable of measuring at high sensitivities the speed of a boby moving over a large stroke.

In accordance with this invention, there is provided a speed detector for detecting the speed of a moving body, and including a core of magnetic material having uniform cross-section, a detection coil uniformly wound about the core, a permanent magnet with one pole thereof faced to the periphery of the detection coil with a definite air gap therebetween, and means for relatively moving the magnet with respect to the core and the coil in accordance with the movement of the moving body. The magnet is positioned such that the flux lines produced thereby cross the coil two times, thereby inducing a direct current voltage in the detection coil having a magnetitude proportional to the speed of movement of the moving body and a polarity depending upon the direction of movement thereof.

BRIEF DESCRIPTION OF THE DRAWINGS

In the accompanying drawings.

DESCRIPTION OF THE PREFERRED EMBODIMENTS

Figure 1:
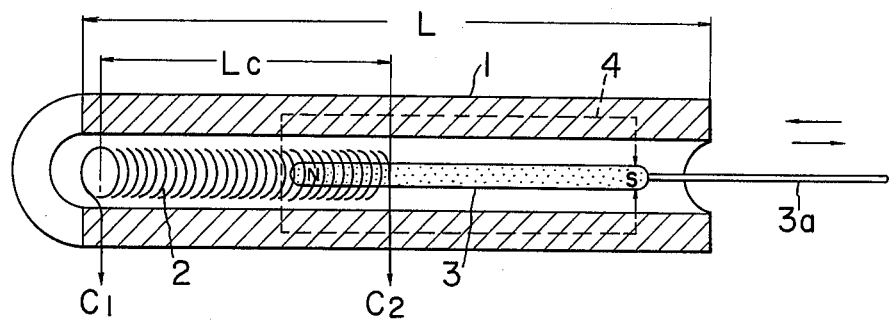
FIG. 1 shows a longitudinal section of a prior art contactless type speed detector.
Figure 2:
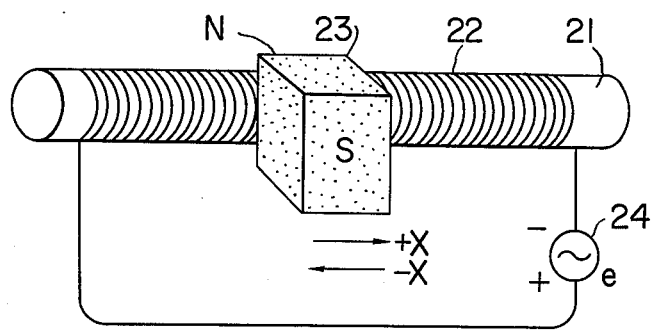
FIG. 2 is a perspective view of a model useful to explain the electromagnetic induction phenomenon utilized in this invention.

Referring now to FIG. 2, about a round rod shaped core 21 of magnetic material is wound a coil 22 having a uniform turn pitch. A cubic permanent magnet 23 is disposed with its N pole opposed to the core 21, and a DC volmeter 24 is connected across the coil 22 to measure the voltage induced therein. When the permanent magnet 23 is moved in the directions of +X and −X along the core 21 with a constant gap therebetween, a DC voltage $e$ will be induced in coil 22 having a magnitude proportional to the speed and a positive or negative polarity depending upon the direction of movement.

Figure 3:
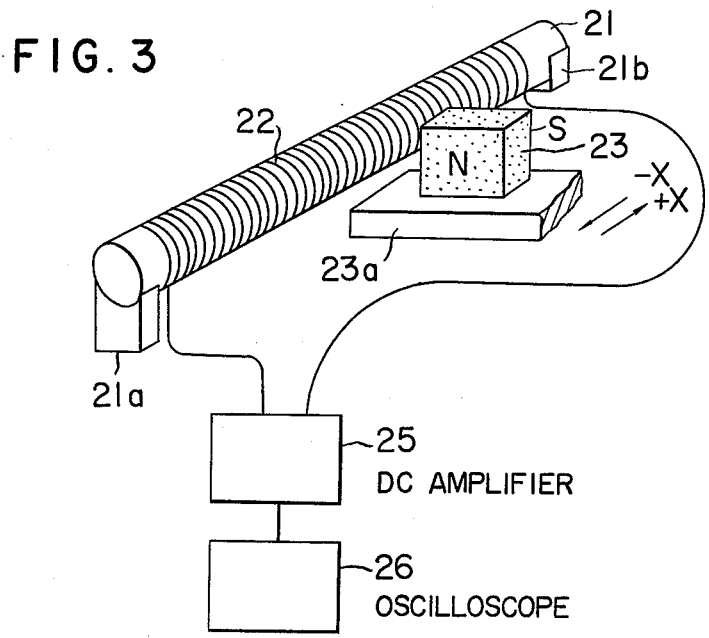
FIG. 3 is a diagrammatic represention similar to FIG. 2 but the orientation of the permanent magnet has varied 90°.

In the arrangement shown in FIG. 3, the permanent magnet has been rotated 90° from the position shown in FIG. 2 so that a line perpendicular to pole surfaces N and S extends in parallel with the axis of the core 21. The magnet 23 is mounted on a non-magnetic slidable base 23a and the opposite ends of the core 21 are supported by pedestals 21a and 21b, respectively. When the magnet 23 is moved in the directions of +X and −X as in the case of FIG. 2, no appreciable voltage is induced across the coil 22. Even when the induced voltage is amplified by a DC amplifier 25 having an amplifying gain of 300 and observed by an oscilloscope 26 it is impossible to detect the induced voltage. From the result of the experiments described above it will be clear that the speed of the magnet 23 can be more efficiently detected when the line perpendicular to the pole surfaces extends at right angles with respect to the axis of core 21 than when the line extends in parallel with the axis of the core.

Figure 4:
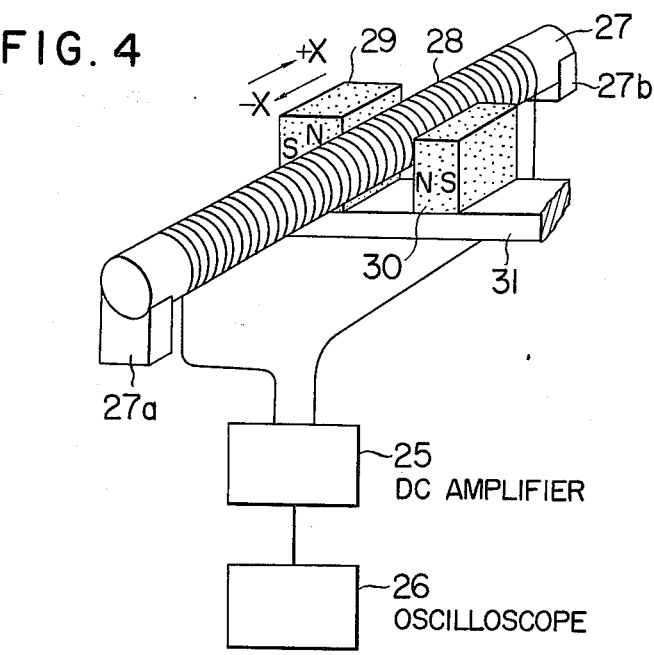
FIG. 4 shows a perspective view of one embodiment of this invention.
Figure 10:
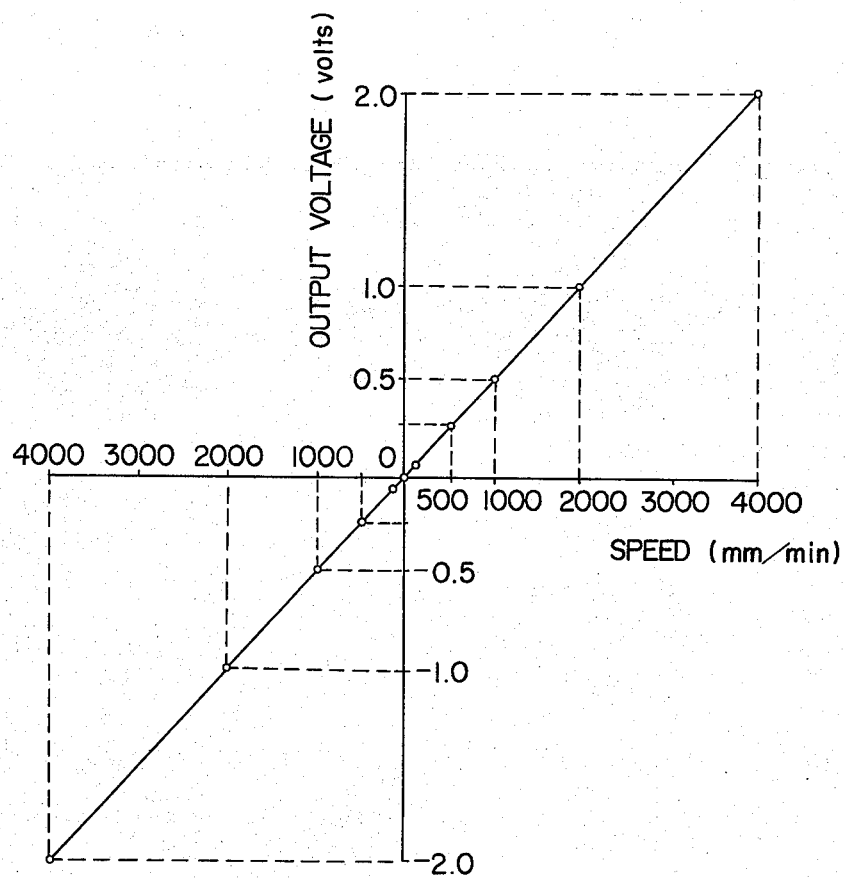
FIG. 10 is a graph showing the relationship between the DC voltage induced in the detection coil and the speed of movement of the magnet of the speed detector shown in FIG. 4.

FIG. 4 shows one embodiment of this invention utilizing the result of experiments made in connection with FIGS. 2 and 3 for obtaining a definite output. This embodiment comprises a round rod shaped core 27 of pure iron and having a diameter of 8 mm, for example, and supported by pedestals 27a and 27b at its opposite ends, a detection coil 28 uniformly wound about the core 27, and a pair of permanent magnets 29 and 30 made of strontium containing ferrite for example, which are mounted on a slidable base 31 to oppose the periphery of the core with their N poles faced to the coil with a definite air gap therebetween. When the magnets are moved in the directions of +X and -X along the core a voltage as shown in FIG. 10 is obtained.

Figure 5:
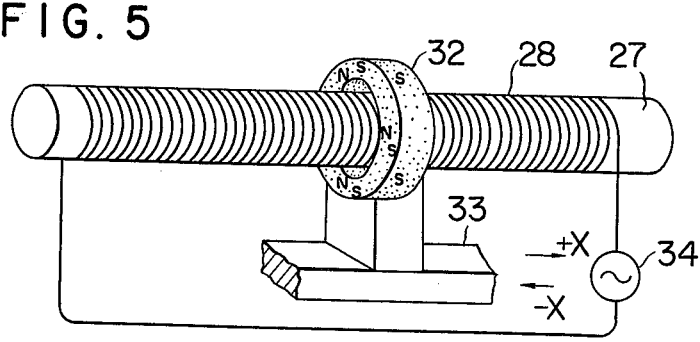
FIg. 5 shows a perspective view of a modified embodiment of this invention.

FIG. 5 shows a modification utilizing a ring shaped or annular permanent magnet 32 magnetized in the radial direction, that is N poles on the inner surface and S poles on the outer surface. The magnet is supported by a non-magnetic slidable base 33, and the detection coil 28 uniformly wound about a magnetic core 27 is connected across a DC voltmeter 34. With this arrangement since the poles of the magnet are disposed to surround the entire periphery of the core, and since it is possible to maintain constant the width of the air gap between the surfaces of N poles and the periphery of the detection coil, it is possible to increase the flux density in the core 27. For the reason described below in connection with equation 3, this arrangement increases the detection sensitivity (DC voltage/speed of movement).

Figure 6:
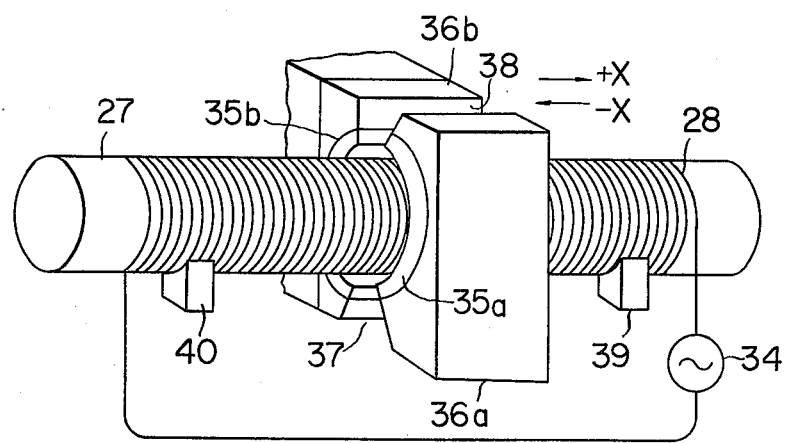
FIG. 6 shows a perspective view of another modification of this invention.

However, ring shaped magnet 32 is relatively difficult to manufacture and is thus expensive, and where the stroke of the slidable base 33 is increased it is necessary to increase the length of the core 27. Where the magnet is moved in the horizontal direction, the core tends to sag downwardly due to its own weight so that it is necessary to increase somewhat the air gap between the inner surface of the ring shaped magnet and the detection coil. These defects can be overcome by a modification shown in FIG. 6 wherein a ring shaped magnet split into two halves 35a and 35b is used. The magnet halves 35a and 35b are provided with integral magnetic yokes 36a and 36b respectively, the contour thereof being described in detail later. Air gaps 37 and 38 are defined between opposed magnet halves 35a and 35b. The core 27 is supported by a pair of spaced apart pedestals 39 and 40 to prevent the downward sag of the core. The lower air gap 37 prevents interference between pedestals 39 and 40 and the magnet halves 35a and 35b. The operation of this embodiment is similar to that of the embodiment shown in FIG. 5.

Figure 7:
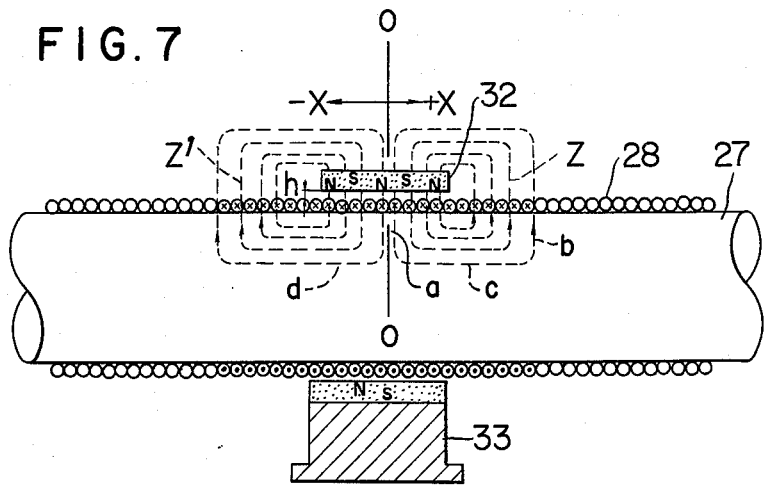
FIG. 7 shows a longitudinal sectional view of the embodiment shown in FIG. 5.

FIG. 7 shows a longitudinal sectional view of the embodiment shown in FIG. 5. The purpose of FIG. 7 is to analyze the effect upon the induced voltage in the detection coil 28 of the relative arrangement of the core 27, coil 28, the surfaces of the N and S poles in the arrangements shown in FIGS. 4, 5 and 6.

When applying equation 1, for the sake of description, it is assumed now that instead of moving the magnet 32 in the horizontal direction, the core 27 and the coil 28 are moved in the horizontal direction. Of course, the same output voltage can be obtained. As shown in FIG. 7 the magnetic flux lines Z and Z' produced by the N poles flow in the opposite directions towards the S poles through the air gap and the core 27 as shown by the dotted lines. The flux lines in the lower half are not shown. In this manner, the flux lines Z and Z' cross the detection coil 28 two times, as shown at $a$ and $b$, so that the voltages induced in the coil by flux lines Z and Z' when the coil is moved in the horizontal direction cancel each other with the result that the net output voltage is zero.

For this reason, the first term $\oint_c$ (UBdL) in equation 1 is zero. The second term $$\iint_s \frac{\delta B_n dS}{\delta t}$$

represents the voltage induced in the coil by the flux lines inside the coil and extending in parallel with the axis of the coil, for example $c$ and $d$ in FIG. 7, when the coil and magnets are moved relatively. More particularly, assuming now that as the magnet is moved in the direction of +X, on the righthand side of the center line o — o of the magnet, the direction of flux $c$ coincides with direction +X, whereas on the lefthand side the direction of flux $d$ is opposite to direction +X.

Further, on the advancing side of the magnet, that is on the righthand side, the magnitude of the flux inside the coil has a tendency to increase with time, whereas on the opposite side the magnitude of the flux tends to decrease with time. In other words, denoting the electromotive force induced in the righthand side of the coil caused by the variation with time of the flux density by $$\Delta e_z = - \frac{\delta B_n}{\delta t}$$

since as described above the magnitude or the absolute value of the flux increases on this side, and when it is assumed that the direction of flux $c$ is positive, then $$\frac{\delta B_n}{\delta t} > o$$

Accordingly $$\Delta e_z < 0 \qquad (2)$$

However, on the lefthand side as the direction of flux $d$ is opposite to that of flux $c$, by denoting the flux density by $B_n'$ $$B_n' = - |B n'| \qquad (3)$$

Further, as pointed out above, since the magnitude, or the absolute value of the flux decreases $$\frac{\delta B_n'}{\delta t} = - \frac{\delta |B_n'|}{\delta t} > o \qquad (4)$$

The electromotive force induced in the lefthand side of the coil due to the variation with time of the flux density is expressed as follows.

$$\Delta e'_z = - \frac{\delta B_n'}{\delta t} \quad (5)$$

From equations 4 and 5

$$\Delta e'_z < 0 \quad (6)$$

From equations 2 and 6 it can be noted that $\Delta e_z$ and $\Delta e'_z$ have the same sign.

Similarly, when the magnet is moved in the direction of $-X$ with respect to the coil, $\Delta e_z$ and $\Delta e'_z$ have the same sign but of the opposite sign as those of the previous case. Denoting the values of $\Delta e_z$ and $\Delta e'_z$ by $e_z$ and $e'_z$ respectively, $$e_z = \iint \Delta e_z dS \quad (7)$$

$$e'_z = \iint \Delta e'_z dS \quad (8)$$

In these integrating operations since the sign does not change, the signs of $e_z$ and $e'_z$ are the same as those of $\Delta e_z$ and $\Delta e'_z$. Accordingly $e_z$ and $e'_z$ have the same sign. Moreover, as the distribution of the flux is symmetrical on both sides of the center line o — o so long as the flux density inside the coil is equal $$|B_n| = |B_n'| \quad (9)$$

hence $$\Delta e_z = \Delta e'_z$$
and
$$e_z = e'_z \quad (10)$$

As a result, the DC output voltage is given by the following equation 11

$$e = - \iint_s \frac{\delta B_n}{\delta t} dS = e_z + e_z{}^1 = 2e_z \quad (11)$$

Where the detection coil 28 is moved in the opposite direction $$e = -2e_z.$$

Since flux lines Z and Z' travel through air when they flow from the core 27 to the poles S the reluctance of the air is much higher than that of core 27. Accordingly, when this path is replaced by a magnetic material, the sensitivity of the detector can be increased.

Figure 8:
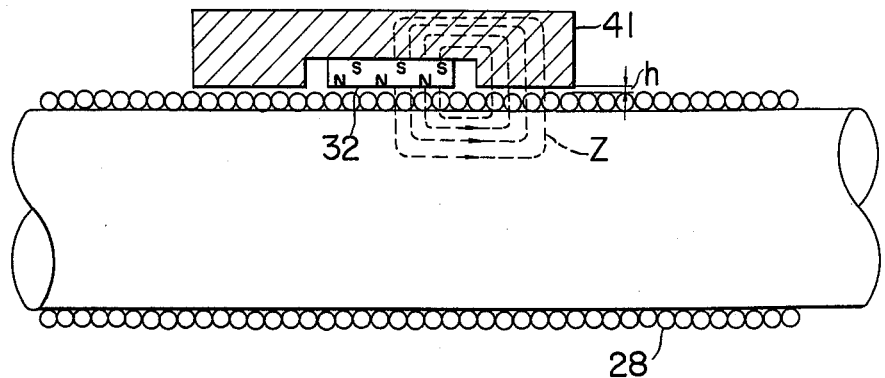
FIG. 8 is a view similar to FIG. 7 but with a yoke added.

FIG. 8 shows such improved construction in which a ring shaped magnet 32 is surrounded by and nested in an annular magnetic yoke 41 having a U-shaped cross-sectional configuration.

Figure 9:
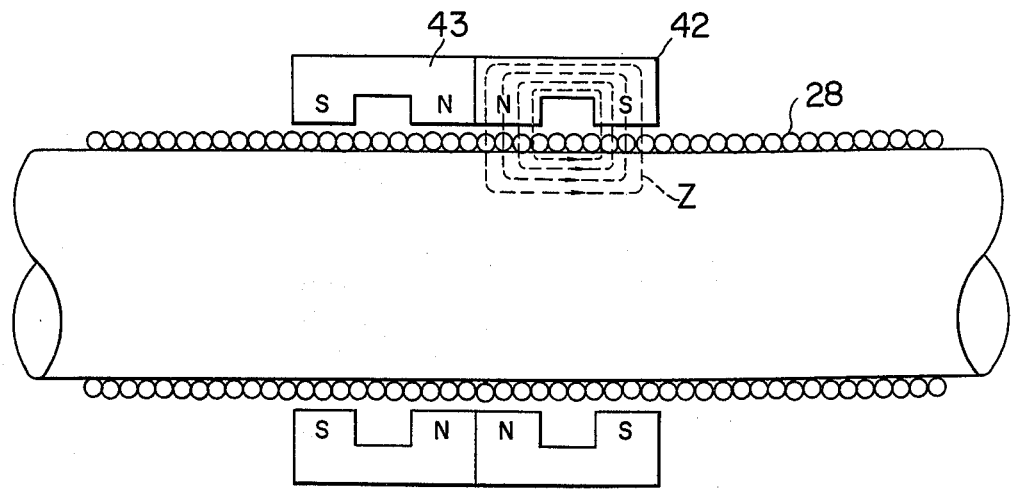
FIG. 9 is a modification of FIG. 8 wherein horse shoe type permanent magnets are used.

FIG. 9 shows an improvement of FIG. 8 in which horse shoe shaped magnets 42 and 43 are used with their N poles disposed longitudinally inwardly. This construction eliminates the necessity of using the yoke.

Instead of mounting the permanent magnets with their N poles faced to the detection coil, it is also possible to dispose the S poles to face the detection coil, the only difference being the reversal of the polarily of the induced voltage.

Although the embodiments described above are constructed to measure the linear speed of a body by using a linear core and a linear coil it is also possible to measure the rotational speed of a rotating body by using an annular core and an annular detection coil.

The speed detector of this invention is useful to measure the speed of an injection piston of an injection molding machine, for example. In such application, the core and coil or the magnet are connected to the piston to move therewith. As there is no limit to the length of the coil, it is possible to measure the speed of movement over a considerably large stroke.

What is claimed is:

1. In a speed detector for detecting the speed of a moving body, said detector being of the type comprising a core of magnetic material having uniform cross-section, a detection coil uniformly wound about said core, a magnet positioned with one pole thereof faced to the periphery of said detection coil with a definite air gap therebetween, and means operatively connected to a moving body for relatively moving said magnet with respect to said core and coil in accordance with the movement of said moving body, the improvement wherein:

said magnet is positioned such that the magnetic flux produced thereby crosses said detection coil two times, comprising means for inducing a direct current voltage in said detection coil having a magnitude proportional to the speed of movement of said moving body and a polarity depending upon the direction of movement thereof.

2. The improvement claimed in claim 1, wherein said permanent magnet comprises a pair of magnets with the respective poles thereof of the same polarity faced to the periphery of said stationary coil with a definite air gap therebetween.

3. The improvement claimed in claim 1, wherein said permanent magnet comprises an annular magnet magnetized in the radial direction thereof.

4. The improvement claimed in claim 3, wherein said annular magnet comprises a pair of semi-circular halves which are disposed to face each other with air gaps therebetween.

5. The improvement claimed in claim 4, wherein each of said halves is provided with a yoke of magnetic material.

6. The improvement claimed in claim 3, wherein said annular magnet is surrounded by and nested in a magnetic yoke having a U-shaped cross-sectional configuration.

7. The improvement claimed in claim 1, wherein said permanent magnet comprises a pair of juxtaposed annular permanent magnets each having a U-shaped cross-sectional configuration, the legs of the respective U-shaped magnets having the same polarity being juxtaposed.

* * * * *